United States Patent [19]

Lasak et al.

[11] 4,432,663
[45] Feb. 21, 1984

[54] CABLE PULLING EYE

[75] Inventors: John L. Lasak, LaGrange Park; Costenzio A. Tuzzalino, Elmhurst, both of Ill.

[73] Assignee: Western Electric Company, Inc., New York, N.Y.

[21] Appl. No.: 203,747

[22] Filed: Nov. 3, 1980

[51] Int. Cl.³ ............................................. F16G 11/05
[52] U.S. Cl. .................................... 403/275; 174/79; 254/134.3 FT; 403/277; 403/281; 403/343
[58] Field of Search ................. 403/11, 275, 277, 281, 403/343; 174/79; 254/134.3 FT; 411/411, 412

[56] References Cited

U.S. PATENT DOCUMENTS

| 113,557 | 4/1871 | Pearson | 403/317 |
|---|---|---|---|
| 2,327,831 | 8/1943 | Sutton | 403/275 |
| 2,867,786 | 1/1959 | Doetsch et al. | 403/343 X |
| 3,989,400 | 11/1976 | Smith et al. | 403/275 |
| 4,183,692 | 1/1980 | Durr | 403/275 |

FOREIGN PATENT DOCUMENTS 31692 6/1885 Fed. Rep. of Germany ...... 403/275

Primary Examiner—Wayne L. Shedd
Attorney, Agent, or Firm—R. P. Miller; K. R. Bergum

[57] ABSTRACT

A cable pulling eye assembly comprises a spike (16) having an auger thread (18), a coaxially mounted shell (36) and an eye (31) with a threaded opening (34), which is mounted on a threaded rear section of the spike. The eye is rotated by a power tool to advance the auger into a bundle of wires (11) of a sheathed cable (10). The shell is subsequently crimped to further force the wires into the flute defined by the auger thread. A pulling steel cable is attached to the eye to draw the cable between telephone poles or through an underground conduit.

2 Claims, 5 Drawing Figures

CABLE PULLING EYE

FIELD OF THE INVENTION

This invention relates to a cable pulling eye for attachment to a multi-wire cable and, more particularly, to a pulling eye cable assembly having an auger bit which enters, displaces and jams the cable wires within a shell so that the cable eye may be pulled to advance the secured cable through a conduit.

BACKGROUND OF THE INVENTION

In many installations of telephone or other cables, one end of the cable is secured to a cable pulling eye which is attached to a wire rope or stranded steel cable that is drawn onto a takeup reel or capstan to advance the pulling cable and the attached telephone cable through a conduit which may be underground or within a building, such as a central office. Such pulling eye devices also find utility during the outdoor installation of cables wherein aerial cables are strung from pole to pole.

Over the years many types of pulling eyes have been developed, each of which include features for firmly securing the cable during a pulling operation without imparting undue stress concentrations that may damage the cable. Another criteria to be considered in the design of such cable pulling devices is the need to keep the outside diameter of the pulling device as near as possible to the outside diameter of the cable, thus obviating the need for conduits or ducts of excessive sizes. A further design criteria resides in the design of a cable pulling eye that may be installed on a cable with a minimum amount of labor and effort.

In the patent to H. E. Durr, U.S. Pat. No. 4,183,692 issued Jan. 15, 1980, there is shown a cable pulling eye having a wedging cone which is assembled between the cable wires and then drawn into position to force the wires against an overlaying conical ring. A thin-walled shell of stepped construction surrounds the secured wire and provides a mounting for a cable eye. The cables are further secured by swaging a stepped portion of the shell to further grip the wires.

Other types of cable pulling eyes are shown in the patents to S. M. Sutton, U.S. Pat No. 2,327,831 issued Aug. 24, 1943 and J. A. Smith, U.S. Pat. No. 3,989,400 issued Nov. 2, 1976. The Sutton patent again uses a wedging member and a concentric ring to grip the wires. The wedging member has a threaded hole therethrough to receive a threaded shank extending from an eye bolt. The wedged wires are surrounded by a shell having a beaten over end which overlies a flange extending from the threaded shank. In the Smith patent a rod with axially spaced barbs is driven into a bundle of cable wires while a shell surrounding the cable is advanced over the cable sheath. The shell is subsequently crimped between the barbs to force the wires into the spaces between the barbs.

In U.S. Pat No. 2,712,953 issued July 12, 1955, to B. S. Snow, there is disclosed a cord coupling constructed of a shell into which a cord is placed. Thereafter a rod having a threaded forward section is screwed through a threaded hole formed in the end of the sleeve so that the rod advances into the cord to displace and secure the cord in the shell. An unthreaded projecting section of the rod is in the form of an eyelet to permit the attachment of the cord coupling to a support.

SUMMARY OF THE INVENTION

This invention contemplates, among other things, a cable pulling eye assembly comprising an auger and a concentrically mounted sleeve which may be easily assembled onto a cable by turning the auger to advance both the auger and the sleeve into and about an end section of the cable.

More particularly, a pulling eye assembly is provided with a sleeve open at one end to receive the end of a cable and closed at the other end to provide a support for a rod. One end section of the rod is formed as an auger thread and is mounted to project axially into the sleeve. The other end of the rod is machined to provide screw threads that receive a pulling eye nut. Both the auger thread and the screw threads on the rod are fabricated to be of the same hand, preferably righthand threads. A jam ring member is secured to the rod and bears against the closed end of the sleeve.

In assembly of the pulling eye onto the end of a multi-wire cable, a power wrench may be employed to grip and turn the pulling eye, whereupon the auger bites into and advances along the cable wires. The advance of the auger bit is accompanied by a movement of the shell over the sheath of the cable. The auger thread is machined so as to have a square cross section with a root flat which is substantially longer than the crest flat. Next, the sleeve is crimped or indented at several locations to drive the wire into the auger flute. A further feature of the invention resides in forming serrations or threads on the auger crest flat which function to further bite into and grip the cable wires. The end of the cable is firmly secured to the pulling eye which may be then utilized to draw the cable through a conduit or between telephone poles.

BRIEF DESCRIPTION OF THE DRAWINGS

Other features and advantages of the invention will be apparent upon consideration of the following detailed description of the drawings, wherein.

DETAILED DESCRIPTION

Figure 1:
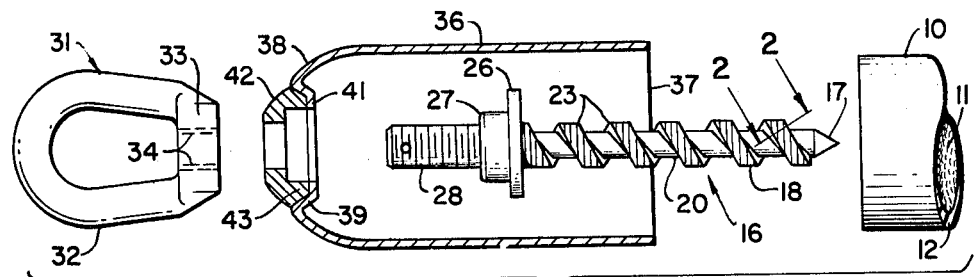
FIG. 1 is an exploded side view partially in section showing the elements of a cable pulling eye embodying the principles of the invention.

Referring to FIG. 1, there is shown the end of a cable 10 having a multitude of wires 11 encased within a deformable sheath 12. Cables of this type are widely used in the telephone industry to interconnect telephone exchanges and individual subscribers to the exchanges. These cables are strung between poles and/or run through underground conduits or building ducts. During installation, it is the usual practice to secure a cable pulling eye to the end of the cable and attach the eye to a stranded or braided steel cable. The steel cable is strung between the poles or run through the conduits and ducts, and then a pulling force is applied to the steel wire and the cable pulling eye to draw or string the cable to complete the desired installation.

Figure 2:
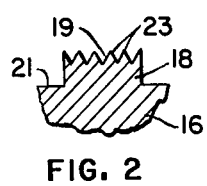
FIG. 2 is a cross-sectional view taken along line 2—2 of FIG. 1 illustrating the cross-sectional configuration of an auger thread formed on a rod that is one of the principal components of the pulling eye assembly.

The pulling eye assembly of the present invention includes a rod or spike 16 that is formed with a pointed tip 17 and a screw auger thread 18. As shown in FIG. 2, the thread is formed with a crest 19 that is flat and a root 21 which is also flat. The width of the thread is constructed so that the width of the root flat 21 is substantially greater than that of the crest flat 19. The flanks of the auger thread 18 are substantially at right angles to the crest and root flats to provide a flute 20 that is substantially rectangular in cross section.

The rod may be constructed by a forging or a machine operation from a piece of steel stock. Serrations 23 may be initially formed on the machine stock or subsequently formed following the forging operation. The serrations may take the form of circular grooves about the axis of the rod or they may be formed as screw threads prior to the machining of the auger thread 18. If the serrations take the form of a screw thread then the machining operation is such that both the auger thread and the serration threads are of the same hand. It is apparent from the drawings that the pitch of the auger thread is substantially greater than that of the serration thread.

The rod is further fabricated to provide a jam ring 26 and a jam nut 27. The left-hand portion of the rod 16 is machined to form screw threads 28. The jam ring 26 and nut 27 may be initially forged during the formation of the auger threads or formed as separate elements, in which case the ring 26 may be welded to the rod while the nut 27 is provided with internal threads to allow the screwing of the nut onto the threads 28 to engage the ring 26. In forming the auger thread 18 and the screw threads 23 and 28, the fabricating operations utilized are such that all the threads have the same hand, preferably all threads of a right hand.

Further, the assembly comprises a pulling eye member 31 which includes a loop section 32 and a straight cross section 33 having a threaded bore 34. The threaded bore 34 permits the eye 31 to be screwed onto the threads of the rod 16.

Figure 3:
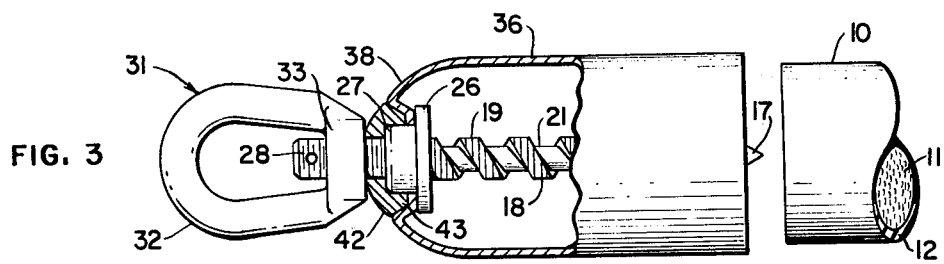
FIG. 3 is a side view partially cut away showing the pulling eye components of FIG. 1 assembled in anticipation of attachment to a multi-wire cable.

The pulling eye assembly also comprises a sleeve or shell 36 of deformable steel having an open end 37 which is of sufficient diameter to receive the end of the cable 10. The other end of the sleeve 36 is substantially closed by forming a nose section 38. The nose section is shaped to provide an inwardly extending flange 39 and a ring section 41. The opening in the ring section 41 is of sufficient diameter to receive the jam nut 27, as shown in FIG. 3. The inwardly extending flange 39 and the ring 41 form a nest to receive a collar 42. The collar 42 is fabricated to provide an axial opening for receiving the threaded end 28 of the rod 16 and a flange rim 43 which is seated in the nest.

In the assembly of the pulling eye, the collar 42 is welded to the nose section 38 of the sleeve 36. Next, the jam nut 27 and the left side of the ring 26 are coated with a sealing cement. The threaded end 28 of the rod 16 is passed through the openings in the collar 42, whereafter the cement sets to form an air tight seal. When assembled, the rod 16 projects axially of the sleeve 36, and the pointed tip 17 extends beyond the open end of the sleeve. Finally, the threaded portion of the eye 31 is screwed onto the threaded section 28 of the rod. The air tight seal may be further enhanced by welding the juncture of the edge of collar 42 and the nose section 38 of the sleeve to form a weldment 45 along the juncture.

Figure 4:
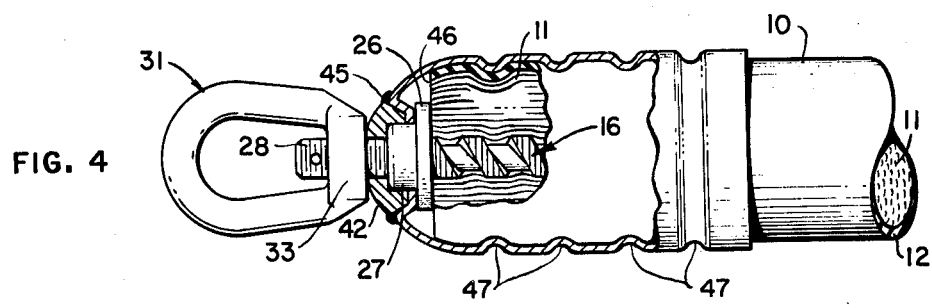
FIG. 4 is a side elevational view partially broken away showing the pulling eye assembly following attachment to the end of a cable.

In use of the pulling eye assembly, the pointed end 17 of the rod 16 is pressed or forced into the center of the bundle of cable wires 11 so that the sleeve 36 is coaxially positioned with respect to the cable sheath 12. A power tool, such as a power wrench, is used to impart a rotating force to the pulling eye 31. Initially, the eye 31 rotates on the threaded section 28 to draw up the jam nut 27 and the collar 42 against the straight section 33 of the eye 31. Continued rotation of the eye causes the auger to turn and screw its way into the bundle of wires 11. In so doing, the advancing auger moves the sleeve 36 over the cable sheath 12. The auger 16 and the sleeve 36 are moved onto the cable 10 until an end 46 of the cable 10 abuts the ring 26 as shown in FIG. 4.

As the auger advances into the bundle of wires, the wires are compressed and then reactively shaped to conform to the shape of the auger. More particularly, the wires are deformed to fit within the flute 20 defined by the auger. The deformed wires have undulations which are firmly seated within the auger flute and engaged by the flanks of the auger thread.

The relatively sharp edges of the square auger teeth bite into the engaged cable wires. The serrations 23 bite into the engaged wires to increase the hold between the cable wires and the pulling eye assembly. Next, the shell 36 is crimped or dimpled, as depicted by reference numeral 47, to further deform the wires and further force the wires into the auger flute. The deforming of the shell acts to further secure the cable sheath to the shell. The assembled pulling eye and cable are now firmly secured together so that a force may be imparted on the eye 32 to pull the cable through a conduit.

Figure 5:
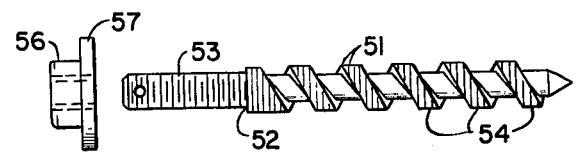
FIG. 5 is an exploded view of an alternative construction of the rod with the auger thread.

An alternative embodiment of the auger screw is shown in FIG. 5. In this embodiment, rod stock may be initially machined to form serrations 51. These serrations may be in the form of circumferential grooves or screw threads. The left-hand end of the rod stock is machined down to a reduced diameter to form a shoulder 52. The left-hand portion of the rod is then turned to form screw threads 53. An auger thread 54, identical to auger thread 18, is then machine cut into the rod stock. A jam nut 56 and a ring 57 are provided with internal threads which are screwed onto the threads 53 until the right-hand face of the ring 57 abuts the shoulder 52. The assembled rod, jam nut and ring are then secured to the sleeve 36 and the pulling eye 31 in the manner previously described with respect to the embodiment shown in FIGS. 1-4. When the collar 42 and the eye 31 are assembled on the threads 53, the application of a rotating force to the eye 31 is effective to jam the ring 57 and the nut 56 against the surface of the sleeve ring 41 and the collar 42 which is engaged by the eye. The assembled auger spike may now be mounted in a shell of the type denoted by the reference numeral 36 for use as a cable pulling eye.

What is claimed is:

1. A cable pulling eye assembly, which comprises:
   a rod having a square auger thread formed along a forward section thereof and a screw thread formed along a rearward section thereof;
   a cylindrical shell means having a closed nose end with an opening therethrough for receiving and supporting said rod in coaxial relation with said shell;
   an eye member having a threaded bore for threadably receiving the threaded section of the rod; and a jam member on said rod positioned within said shell means and jammed into engagement with the inner wall of the closed end of the shell by the eye member being screwed on the threaded rearward section of the rod into engagement with the outer portion of the closed end of the shell means.

2. A cable pulling eye assembly, comprising:

a cylindrical shell having an open end for receiving a sheathed multi-wire cable, said shell having a second closed end with an opening therethrough that is coaxial with respect to the axis of the cylindrical shell;

a rod mounted in said opening and coaxially positioned within the shell, said rod having an auger formed along a leading end section and screw threads formed along a trailing end section which extends through said shell opening, said auger having a thread which defines a single flute;

a jam member secured to the rod within the shell for engaging the inner surface of the closed end of the shell;

an eye member having a threaded bore for receiving the threaded screw section of said rod and for turning the rod to advance the auger into a multi-wire cable positioned within said shell and to draw the jam member against the inner wall of the closed end of the shell when the eye member is advanced to apply a force against the outer wall of the closed end of the shell; and said shell having indentations to deform the wall of the shell to force the wires into the auger flute.

* * * * *